(12) United States Patent
Smith

(10) Patent No.: US 11,214,314 B2
(45) Date of Patent: Jan. 4, 2022

(54) VEHICLE HOOD PROP MEMBER AND RELATED METHOD

(71) Applicant: Warren Dean Smith, Erie, CO (US)

(72) Inventor: Warren Dean Smith, Erie, CO (US)

( * ) Notice: Subject to any disclaimer, the term of this patent is extended or adjusted under 35 U.S.C. 154(b) by 310 days.

(21) Appl. No.: 16/386,892

(22) Filed: Apr. 17, 2019

(65) Prior Publication Data

US 2020/0331537 A1 Oct. 22, 2020

(51) Int. Cl.
*B62D 25/12* (2006.01)
*E05C 17/04* (2006.01)

(52) U.S. Cl.
CPC .............. *B62D 25/12* (2013.01); *E05C 17/04* (2013.01)

(58) Field of Classification Search
CPC ... B62D 25/12; E05C 17/04; E05Y 2900/536; E05Y 2201/41; E05Y 2201/422
USPC ...................................................... 180/69.21
See application file for complete search history.

(56) References Cited

U.S. PATENT DOCUMENTS

| 3,225,857 | A | * | 12/1965 | Wolbert | B62D 25/12 180/69.21 |
|---|---|---|---|---|---|
| 4,991,675 | A | * | 2/1991 | Tosconi | B62D 25/10 180/69.21 |
| 6,345,679 | B1 | * | 2/2002 | Sasaki | B60R 21/38 180/271 |
| 2016/0144822 | A1 | * | 5/2016 | Kim, II | B60R 21/34 16/222 |
| 2016/0264185 | A1 | * | 9/2016 | Keller | B62D 25/12 |
| 2017/0335610 | A1 | * | 11/2017 | Hall | E05D 3/145 |

\* cited by examiner

*Primary Examiner* — James A Shriver, II
*Assistant Examiner* — Hilary L Johns
(74) *Attorney, Agent, or Firm* — David A. Costa

(57) ABSTRACT

A hood prop member for a vehicle is provided having a support rod that has a first end configured to attach proximate a firewall of the vehicle, and a second end configured to couple proximate to a body panel of the vehicle. A prop rod having a connection end and a pivoting end is provided. The pivoting end is pivotingly attached proximate an end of the support rod. A hood attachment bracket is configured to attach to a hood of the vehicle. A storage connection point is attached to the support rod proximate an end opposite an end to which the pivoting end of the prop rod is proximately coupled. The connection end is attachable to the storage connection point in a hood-down position. The connection end is also attachable to the hood attachment bracket and configured to maintain the hood of the vehicle in a hood-raised position.

13 Claims, 5 Drawing Sheets

VEHICLE HOOD PROP MEMBER AND RELATED METHOD

FIELD OF THE INVENTION

The invention relates to a vehicular body connecting apparatus and related method, and more particularly, pertains to a new and improved multi-position support apparatus configured to support a hood while also providing additional vehicular structural integrity.

BACKGROUND

In a number of vehicles, a support member is provided that spans between the vehicle's firewall and another body portion of the vehicle, such as a fender or front grill, for example. The object of the support member is to aid in the alignment of the body portion to which it connects, and also to provide structural integrity to the vehicle's body assembly. Such support members are often rods that are relatively thin and made of relatively soft metals, thus allowing movement or "play" in the vehicle portions to which it connects. This is especially the case when the vehicle hood is in the open position, as any additional support provided by the hood when latched to the vehicle body is removed.

To exacerbate this issue, hoods tend to be relatively heavy, and are often supported by hinges that attach to a vehicle portion that relies on support provided by a support member. Therefore, when the hood is open, not only is the support provided by the hood absent, but the entire weight of the hood is redistributed to a weakly supported body portion, adding further strain to weak support members.

Custom or show vehicles are often displayed with the hood up so that show participants and judges may view the interior of the vehicle's engine compartment. Often, such events are held outside where wind may catch the large surface area of the hood and drastically increase the forces on support members, related body portions, and the hood itself. Wind gusts may thus be responsible for bending and even shearing support members, related body portions, the hood itself, etc.

Additionally, hoods generally rest on a hood prop using gravity alone to maintain the connection between the hood and the hood prop. Wind may easily jolt the hood off a standard hood prop, which results in a forceful slamming of the hood into the down position or even in the direction opposite from closing. In either case, hood separation, bending, and/or other vehicular damage may occur. Even worse, bodily injury or death may occur to nearby individuals.

The present invention provides a support member that bolsters vehicular structural integrity when in one position, yet provides a hood locking mechanism when in another position.

SUMMARY OF THE INVENTION

A hood prop member for a vehicle is provided that comprises a support rod having a first end configured to attach proximate a firewall of the vehicle, and a second end configured to couple proximate another portion of the vehicle. A prop rod is provided that has a connection end and a pivoting end, wherein the pivoting end of the prop rod is pivotingly attached proximate an end of the support rod. A hood attachment bracket is configured to be coupled to a hood of the vehicle. A storage connection point is coupled to the support rod proximate an end opposite an end to which the pivoting end of the prop rod is proximately coupled. The connection end of the prop rod is attachable to the storage connection point in a hood-down position, and the connection end of the prop rod is also attachable to the hood attachment bracket and configured to maintain the hood of the vehicle in a hood-raised position.

A hood prop member for a vehicle is provided that comprises a first connecting member having a first end configured to attach to a first portion of the vehicle, and a second end configured to attach to a second portion of the vehicle. A second connecting member has a connection end and a pivoting end, wherein the pivoting end is pivotingly attached proximate to one of the first end and the second end of the first connecting member. A hood attachment bracket is configured to attach to a hood of the vehicle. A storage connection point is attached to the first connecting member proximate an end opposite an end to which the pivoting end of the second connecting member is attached. The connection end of the second connecting member is attachable to the storage connection point in a first position, and the connection end of the second connecting member is attachable to the hood attachment bracket in a second position.

A method for configuring a vehicle is provided, comprising the steps of providing a support rod having a first end configured to attach to a first portion of the vehicle and a second end configured to attach to a second portion of the vehicle. A prop rod is provided having a connection end and a pivoting end. The pivoting end of the prop rod is pivotingly attached proximate an end of the support rod. A hood attachment point is provided with a hood of the vehicle. A storage connection point is provided proximate the support rod, and being couplable to the connection end of the prop rod. The connection end of the prop rod is attached to the storage connection point to increase the structural integrity of the support rod while the hood is in a down position. The connection end of the prop rod is attached to the hood attachment bracket to maintain the hood of the vehicle in a hood-raised position.

ASPECTS OF THE INVENTION

According to an aspect, a hood prop member for a vehicle comprises: a support rod having a first end configured to attach proximate a firewall of the vehicle, and a second end configured to couple proximate another portion of the vehicle; a prop rod having a connection end and a pivoting end, wherein the pivoting end of the prop rod is pivotingly attached proximate an end of the support rod; a hood attachment bracket configured to be coupled to a hood of the vehicle; a storage connection point coupled to the support rod proximate an end opposite an end to which the pivoting end of the prop rod is proximately coupled; and wherein the connection end of the prop rod is attachable to the storage connection point in a hood-down position, and the connection end of the prop rod is also attachable to the hood attachment bracket and configured to maintain the hood of the vehicle in a hood-raised position.

Preferably, the pivoting end of the prop rod is pivotingly attached to the support rod.

Preferably, the connection end of the prop rod comprises a rod end bearing.

Preferably, the hood prop member comprises a first pin with the hood attachment bracket, a second pin with the storage connection point, and wherein the first and second pins are operable to engage the rod end bearing.

Preferably, the hood prop member comprises a first ball detent with the first pin, a second ball detent with the second pin, and wherein the first and second ball detents are operable to maintain the rod end bearing on the first pin and second pin, respectively.

Preferably, the pivoting end of the prop rod comprises a rod end bearing.

Preferably, the hood prop member comprises a first connecting member having a first end configured to attach to a first portion of the vehicle, and a second end configured to attach to a second portion of the vehicle, a second connecting member having a connection end and an pivoting end, wherein the pivoting end is pivotingly attached proximate to one of the first end and the second end of the first connecting member, a hood attachment bracket configured to attach to a hood of the vehicle, a storage connection point attached to the first connecting member proximate an end opposite an end to which the pivoting end of the second connecting member is attached, and wherein the connection end of the second connecting member is attachable to the storage connection point in a first position, and the connection end of the second connecting member is attachable to the hood attachment bracket in a second position.

Preferably, the pivoting end of the prop rod is pivotingly attached to the support rod.

Preferably, the connection end of the prop rod comprises a rod end bearing.

Preferably, the hood prop member comprises a first pin with the hood attachment bracket, a second pin with the storage connection point, and wherein the first and second pins are operable to engage the rod end bearing.

Preferably, the hood prop member comprises a first ball detent with the first pin, a second ball detent with the second pin, and wherein the first and second ball detents are operable to maintain the rod end bearing on the first pin and second pin, respectively.

Preferably, the pivoting end of the prop rod comprises a rod end bearing.

Preferably, a storage connection point is coupled to the support rod, wherein the prop rod is couplable to the storage connection point.

Preferably, the method for configuring a vehicle comprises providing a support rod having a first end configured to attach to a first portion of the vehicle and a second end configured to attach to a second portion of the vehicle, providing a prop rod having a connection end and a pivoting end, pivotingly attaching the pivoting end of the prop rod proximate an end of the support rod, providing a hood attachment point with a hood of the vehicle, providing a storage connection point proximate the support rod, and being couplable to the connection end of the prop rod, attaching the connection end of the prop rod to the storage connection point to increase the structural integrity of the support rod while the hood is in a down position, and attaching the connection end of the prop rod to the hood attachment bracket to maintain the hood of the vehicle in a hood-raised position.

Preferably, the storage connection point is attached to the support rod.

DETAILED DESCRIPTION OF THE INVENTION

FIGS. 1-5 and the following description depict specific examples to teach those skilled in the art how to make and use the best mode of embodiments of a vehicular support member and related methods. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
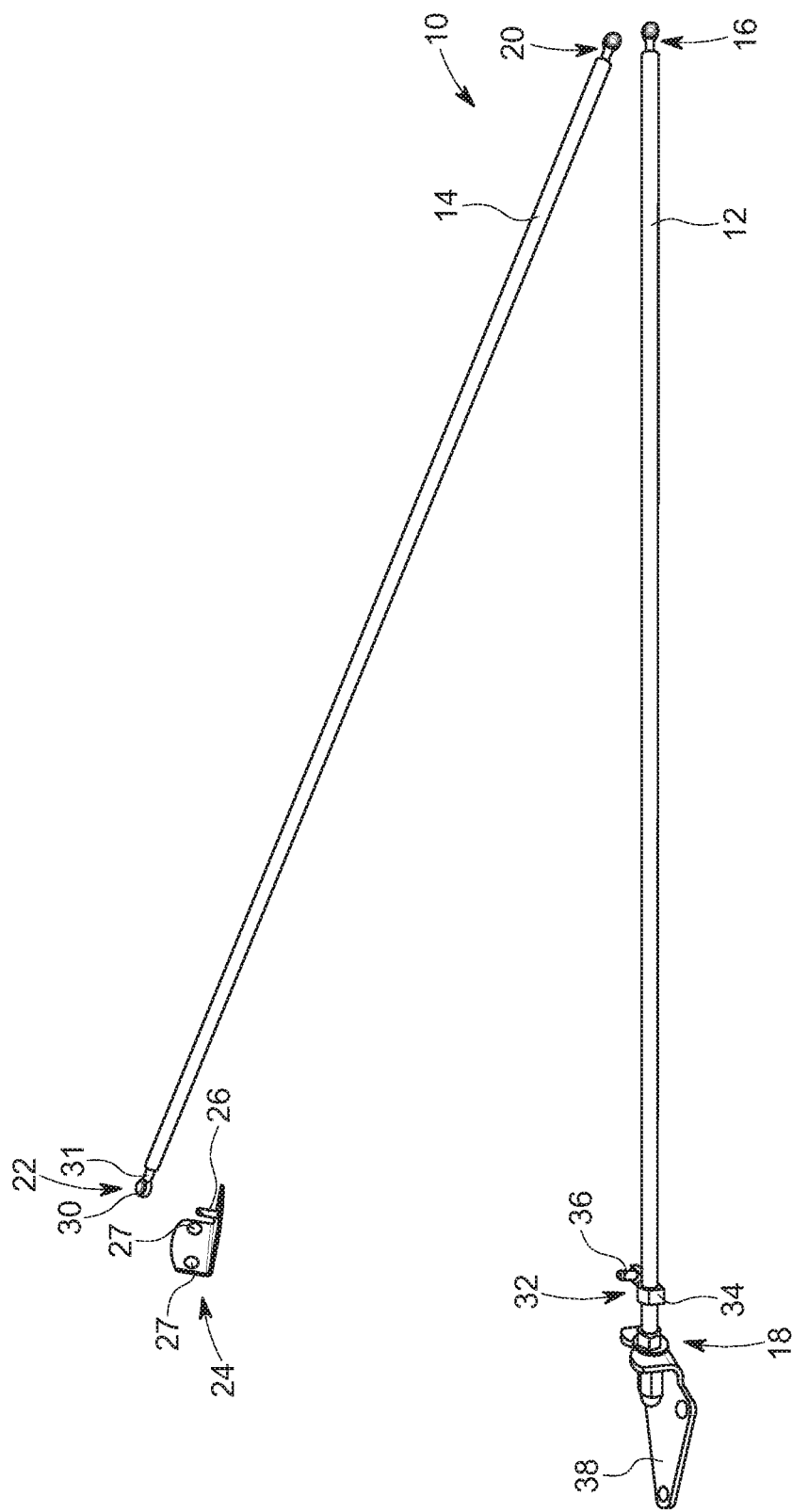
FIG. 1 illustrates an uninstalled hood prop member according to an embodiment.

Turning to FIG. 1, an uninstalled hood prop member 10 is illustrated in a position that corresponds to a hood-up position, if the hood prop member 10 were installed and in use. A vehicle is omitted for clarity. The hood prop member 10 has a support rod 12 and a prop rod 14. The hood prop member 10 is operable such that in one configuration (i.e. the "hood-down" position) the prop rod 14 is secured proximate the support rod 12, and in another configuration (i.e. the "hood-up" position) the prop rod 14 is free to be couplable to a vehicle's hood. When in the hood-down position, the prop rod 14 provides additional structural support to support rod 12, and thus bolsters the structural integrity of the vehicle. When the hood is in the up position, the prop rod 14 may instead serve as the member responsible for securely maintaining the hood in the up position. The support rod 12 and a prop rod 14 are illustrated as round rods, but in alternate embodiments, one or both of the support rod 12 and prop rod 14 may comprise an oval, square, polygonal, or flat cross-section, or combinations thereof. The support rod 12 and prop rod 14 may have regions cutout along their lengths for weight saving and/or aesthetic purposes. The preferred material for various components of the hood prop member 10 is metal or alloy, but polymer, composite, and other materials known in the art are also contemplated. Combinations of materials for various components of the hood prop member 10 are also contemplated.

The support rod 12 has a first end 16 configured to be coupled to one portion of a vehicle and a second end 18 configured to be coupled to another portion of the vehicle. In an embodiment, the first end is configured to be attachable proximate a firewall of an automobile, and the second end 18 is configured to be coupled proximate a body panel of the automobile. The body panel may be a bumper, grill, fender, a similar body portion, or a coupling member attached to a bumper, grill, or fender, or similar body portion. Other body portions are also contemplated for attachment, such as battery trays, shock towers, roll bars, sway bars, strut bars, stabilizers, and/or other vehicle body portions, etc., for example, as every vehicle model is different, so different attachment points may be necessary to accommodate a particular vehicle's configuration, as will be understood by those skilled in the art.

The support rod 12 is thus coupled to two vehicular body portions—one body portion coupled proximate each end 16, 18 of the support rod 12. Conversely, the prop rod 14 is attached proximate an end 16, 18 of the support rod by a pivoting end 20 of the prop rod 14, and a connecting end 22 of the prop rod 14 may be coupled to different attachment points, depending on whether the vehicle is in a hood-up or hood-down state. When the hood is closed and in the down position, the connecting end 22 of the prop rod 14 is preferably coupled to the support rod 12. However, when the hood is open and in the up position, the connecting end 22 of the prop rod 14 is preferably coupled to the vehicle's hood.

Figure 2:
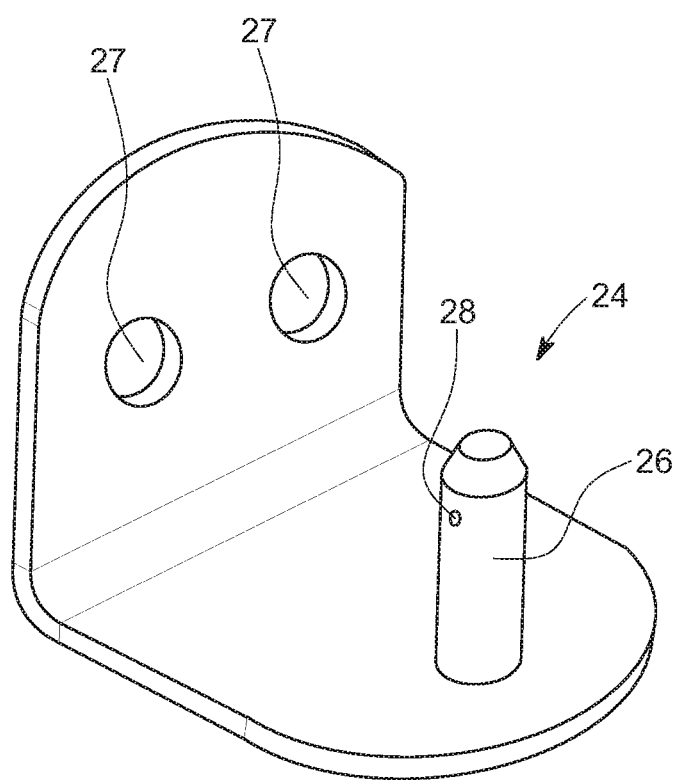
FIG. 2 illustrates a hood bracket according to an embodiment.

In order for the for the prop rod 14 to be coupled to the vehicle's hood, a hood attachment bracket 24 may be provided. The hood attachment bracket 24 may be secured to a hood with fasteners 29, secured by welding or brazing, secured by adhesive, or may be an integral portion of a hood. An embodiment of a hood attachment bracket 24 is illustrated in FIG. 2. In this embodiment, a first pin 26 having a detent 28 is provided. The connecting end 22 of the prop rod 14 is configured to couple to the first pin 26. A pin 26 is merely an example, as other mechanical couplings are contemplated. Apertures 27 may be provided that allow fasteners 29 to pass through to fasten the hood attachment bracket 24 to a hood.

In an embodiment, the connecting end 22 of the prop rod 14 comprises a rod end bearing 30 (also known as a Rose joint or Heim joint). The rod end bearing 30 is a mechanical articulating joint having a ball swivel with an opening therein through which the pin 26 may pass. A bolt, shaft, cotter pin, hook, or other attaching hardware is contemplated in addition to, or in place of, the pin 26. Since there is often play or give in a sheet metal or a fiberglass hood, for example, the connection between the hood and automobile body, which also may have some play or give in it via a hood prop, is not generally a particularly precision attachment so the rod end bearing 30 to pin 26 connection permits limited misalignment, and thus accommodates large tolerances that may change over time between the hood and vehicle body. Despite the accommodation for large tolerances, the pin 26 and detent 28 provided create an extremely robust connection that results in little play, yet is easy to engage and disengage.

The ball swivel is disposed in a casing that is configured to be joined to the connection end 22 of the prop rod 14. In an embodiment, the casing of the rod end bearing 30 has a threaded portion 31 that engages the connection end 22 of the prop rod 14, and the connection end 22 is configured with mating threads. The threaded portion of the rod end bearing may be either male or female, with the connection end 22 of the prop rod 14 having complimentary threading. The rod end bearing 30 may alternatively be attached by welding, brazing, adhesives, or the like.

Figure 3:
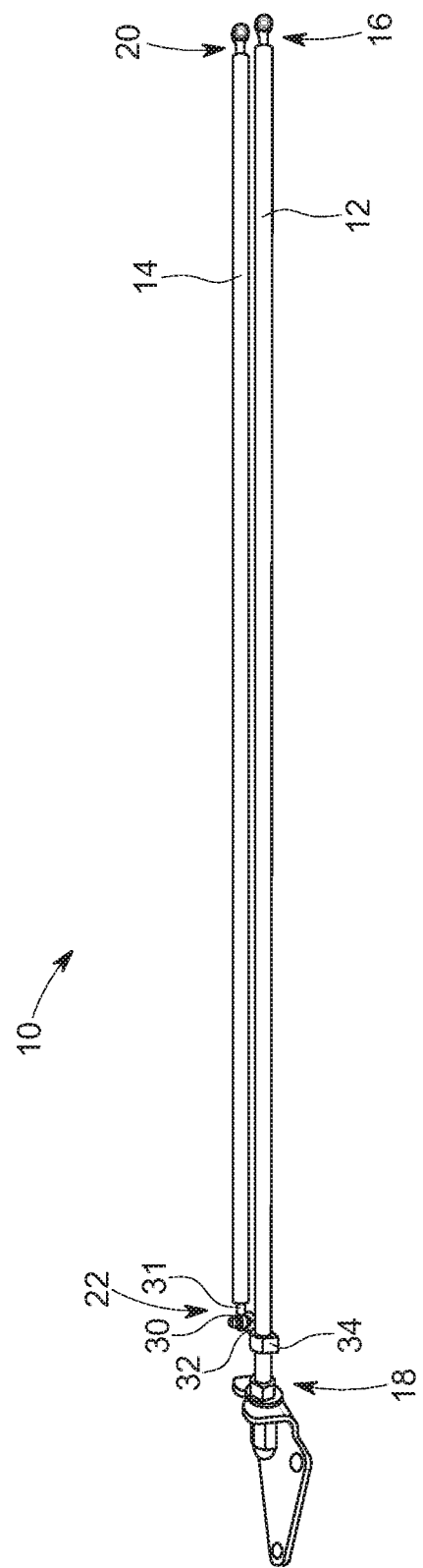
FIG. 3 illustrates the uninstalled hood prop member of FIG. 1 in a different conformation.

FIG. 3 illustrates the uninstalled hood prop member 10 in a position that corresponds to a hood-down position, situated as if the hood prop member 10 were installed and in use. A vehicle is omitted for clarity. In this configuration, the prop rod 14 is secured proximate to, or coupled directly to, the support rod 12. By coupling the prop rod 14 to the support rod 12, the prop rod 14 provides additional structural support to the support rod 12 and the adjacent body portions, thus improving the structural integrity of the vehicle. Therefore, the prop rod 14 is not merely wasted weight or space when in the hood-down position like on conventional hood props. It should be noted that in FIGS. 1 and 3, that the first end 16 of the support rod and the pivoting end 20 of the prop rod 14 are positioned proximate each other in space. This is merely for clarity, but when the hood prop member 10 is installed and in use, the first end 16 of the support rod and the pivoting end 20 of the prop rod 14 are coupled either directly to each other, to at least one bracket, and/or to a portion of a vehicle.

Figure 4:
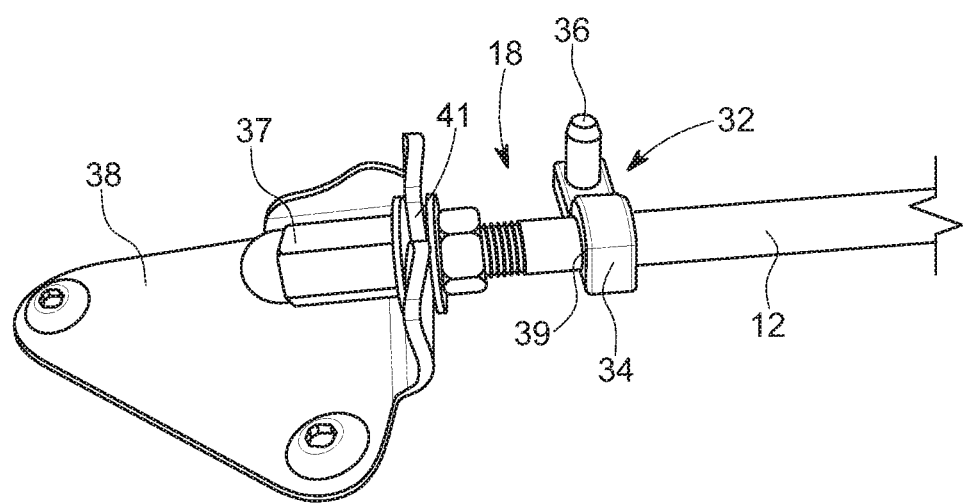
FIG. 4 illustrates an embodiment of a storage connection point.

In an embodiment, a storage connection point 32 is coupled to the support rod 12. The storage connection point 32 is located proximate the point where the prop rod 14 may be coupled to the support rod 12. In an embodiment, the storage connection point 32 is located proximate an end of the support rod 12 that is opposite an end of the support rod whereby the prop rod 14 is proximately pivotally anchored. In an embodiment, the storage connection point 32 is a bracket 34 attachable to the support rod that supports a second pin 36 having a second detent, and is illustrated in FIG. 4. In alternate embodiments, the storage connection point 32 may be a portion of a support rod bracket 38 or coupled to a vehicle portion.

The connecting end 22 of the prop rod 14 is configured to couple to the second pin 36 in a similar manner to which it attaches to the first pin 26. A pin 26, 36 is merely an example, as other mechanical couplings are contemplated. In an embodiment, the first pin 26 and/or the second pin 36 may comprise a locking means to prevent the connecting end 22 of the prop rod 14 from disengaging the pins 26, 36. A non-limiting example is a cotter pin that may pass through a distal portion of the pins 26, 36 that physically blocks the connecting end 22 of the prop rod 14 from disengaging the pin 26, 36. Other means for physically preventing the connecting end 22 of the prop rod 14 from disengaging the pins 26, 36 are also contemplated.

In an embodiment, the bracket 34 has an aperture 39 that accepts the support rod, such that the bracket 34 is slidable onto the support rod 12 and positionable such that the connection end of the prop rod may be coupled to the bracket 34. In another embodiment, the bracket 34 may clamp onto the support rod 12. In another embodiment, the bracket 34 is formed integrally with the support rod 12. In another embodiment, the bracket 34 is welded, brazed, or otherwise adhered to the support rod 12. In yet another embodiment, the bracket 34 is not attached to the support rod 12, but is instead located proximate the second end 18 of the support rod 12, and coupled to a body panel or other appropriate portion of the automobile. In yet another embodiment, the bracket 34 is coupled to the support rod bracket 38.

The support rod bracket 38 may be integral to the vehicle. In the embodiment illustrated in FIG. 4, fasteners are illustrated that allow the support rod bracket 38 to be coupled to an appropriate portion of a vehicle, as will be understood by those skilled in the art. The support rod bracket 38 serves to anchor the support rod 12. In the embodiment illustrated, the support rod 12 is coupled to the support rod bracket with mechanical fasteners. Mechanical fasteners can allow the effective length of the support rod 12 to be adjustable, as will be understood. In an example embodiment, a barrel nut 37 accepts a threaded portion of the second end 18 of the support rod, and the engaging threads with the barrel nut 37 is utilized for fine adjustment of the effective length of the support rod 12. As more threads are engaged, the shorter the length of the support rod becomes available, as the support rod 12 is pulled through a slot or aperture 41 of the support rod bracket 38, as will be apparent. This also serves as a means to tension the support rod 12, and increase the rigidity of the portions of the vehicle that are coupled via the support rod 12.

Figure 5:
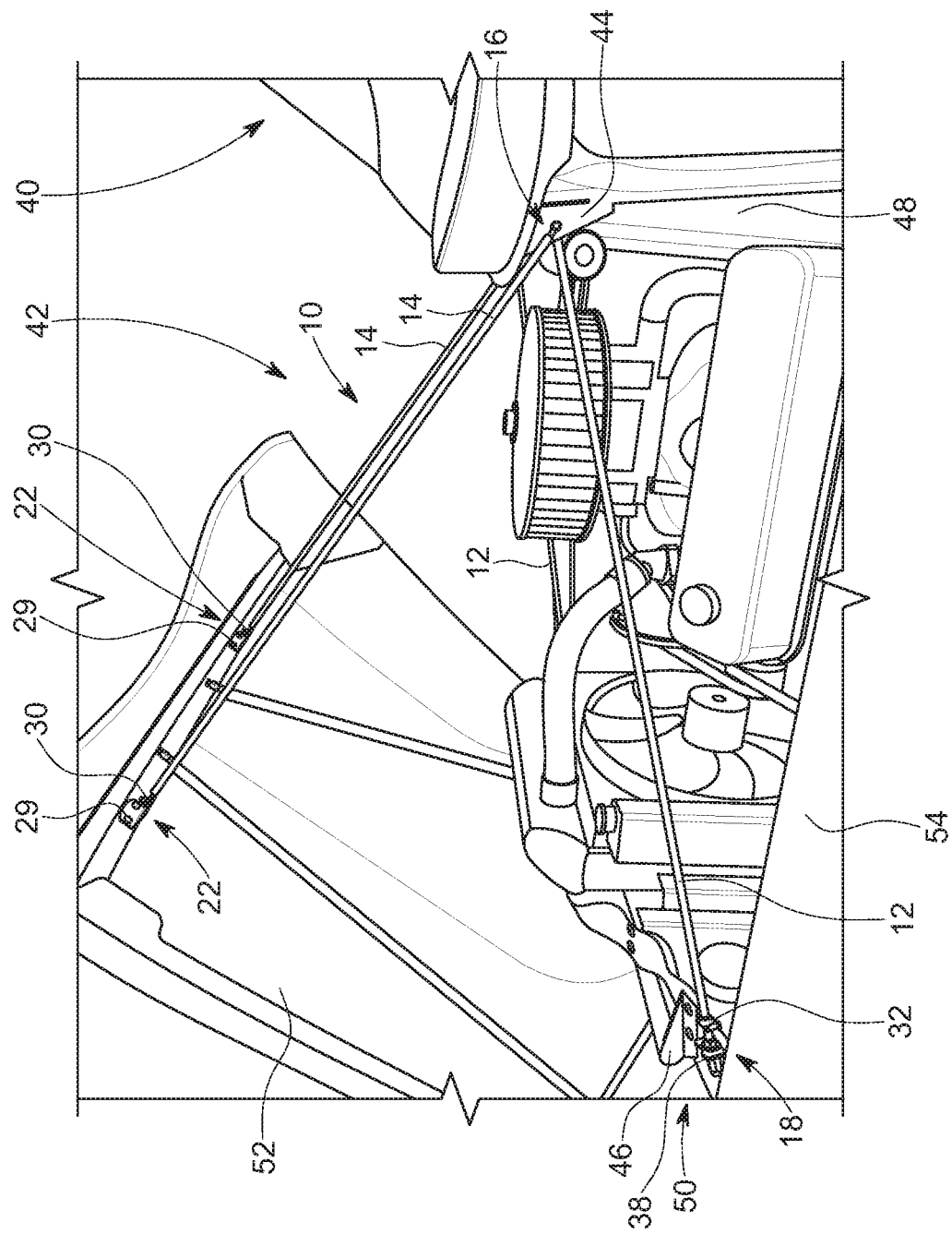
FIG. 5 illustrates an embodiment of a hood prop member installed in an automobile.

FIG. 5 illustrates an embodiment of the hood prop member 10 installed in an automobile. The configuration illustrated is that of the automobile 40 having a hood in the up position. In this application, the hood prop member 10 is installed in the automobile's 40 engine compartment 42. The support rod 12 is attached to a first body portion 44 via the first end 16 and a second body portion 46 via the second end 18. The first body portion 44 illustrated in this example is the automobile's firewall 48, and the second body portion 46 in this example is a portion of the automobile's radiator valance/front grill assembly 50.

The prop rod 14 is attached proximate the first end 16 of the support rod 12 by a pivoting end 20 of the prop rod 14 that, in this application, comprises a rod end bearing. As already noted, the connecting end 22 of the prop rod 14 may be coupled to different attachment points, depending on whether the vehicle is in a hood-up or hood-down state. When the hood 52 is closed and in the down position, the connecting end 22 of the prop rod 14 is preferably coupled to the support rod 12. However, when the hood 52 is open and in the up position, the connecting end 22 of the prop rod 14 is preferably coupled to the vehicle's hood 52, directly or with a hood attachment bracket 24.

In the hood-up position illustrated in FIG. 5, the prop rod 14 is attached to the vehicle's hood via the hood attachment bracket 24. When the hood 52 is in the up position, the prop rod 14 instead serves as the member responsible for maintaining the hood 52 in the up position, as previously discussed.

In the hood-down position (not illustrated) the prop rod 14 is, in this example, secured to the support rod via the storage connection point 32. When in the hood-down position, the prop rod 14 provides additional structural support to support rod 12, and thus bolsters the structural integrity of the vehicle—in this case, the connection between the firewall 48 and the radiator valence/front grill assembly 50 is markedly strengthened. This results in a stronger overall body and more rigid hood 52 and fender 54 attachments, as these components are directly or indirectly coupled to the firewall 48 and the radiator valence/front grill assembly 50.

As illustrated, in either the hood-down or hood-up position, the second end 18 of the support rod is coupled to the support rod bracket 38, which is in turn coupled to the radiator valance/front grill assembly 50.

It should be noted that the configuration described is for a vehicle that has a hood that is hinged proximate a radiator valance/front grill assembly 50. It is contemplated that the entire assembly may be reversed such that the vehicle may have a hood that is hinged proximate the firewall 48. Additionally, in embodiments where a hood or hatch opens in a manner approximately 90 degrees from the above, such as on an aircraft, the orientation of the hood prop member 10 may be adjusted accordingly. More than one hood prop member may be installed in a particular application.

It should be noted that although an automobile is illustrated and automotive applications are described throughout the description, that the hood prop member 10 may be used in other applications where a door, hood, hatch, or panel is utilized that may be operable from an open to a closed position. As such, use in watercraft, aircraft, and other vehicles, machinery, and any application where a door, hood, hatch, or panel is utilized is contemplated.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in-whole or in-part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein can be applied to other devices and methods, and not just to the embodiments described above and shown in the accompanying figures. Accordingly, the scope of the invention should be determined from the following claims.

What is claimed is:

1. A hood prop member for a vehicle, comprising:
    a support rod having a first end configured to attach proximate a firewall of the vehicle, and a second end configured to couple proximate another portion of the vehicle;
    a prop rod having a connection end and a pivoting end, wherein the pivoting end of the prop rod is pivotingly attached proximate an end of the support rod, and wherein the connection end of the prop rod comprises a rod end bearing;
    a hood attachment bracket configured to be coupled to a hood of the vehicle;
    a storage connection point coupled to the support rod proximate an end opposite an end to which the pivoting end of the prop rod is proximately coupled; and
    wherein the connection end of the prop rod is attachable to the storage connection point in a hood-down position, and the connection end of the prop rod is also attachable to the hood attachment bracket and configured to maintain the hood of the vehicle in a hood-raised position.

2. The hood prop member for a vehicle of claim 1, wherein the pivoting end of the prop rod is pivotingly attached to the support rod.

3. The hood prop member for a vehicle of claim 1, comprising:
    a first pin with the hood attachment bracket;
    a second pin with the storage connection point; and
    wherein the first and second pins are operable to engage the rod end bearing.

4. The hood prop member for a vehicle of claim 3, comprising:
    a first ball detent with the first pin;
    a second ball detent with the second pin; and
    wherein the first and second ball detents are operable to maintain the rod end bearing on the first pin and second pin, respectively.

5. The hood prop member for a vehicle of claim 1, wherein the pivoting end of the prop rod comprises a rod end bearing.

6. A hood prop member for a vehicle, comprising:
    a first connecting member having a first end configured to attach to a first portion of the vehicle, and a second end configured to attach to a second portion of the vehicle;
    a second connecting member having a connection end and a pivoting end, wherein the pivoting end is pivotingly attached proximate to one of the first end and the second end of the first connecting member, and wherein the connection end comprises a rod end bearing;
    a hood attachment bracket configured to attach to a hood of the vehicle;

a storage connection point attached to the first connecting member proximate an end opposite an end to which the pivoting end of the second connecting member is attached; and wherein the connection end of the second connecting member is attachable to the storage connection point in a first position, and the connection end of the second connecting member is attachable to the hood attachment bracket in a second position.

7. The hood prop member for a vehicle of claim 6, wherein the pivoting end of the prop rod is pivotingly attached to the support rod.

8. The hood prop member for a vehicle of claim 6, comprising:
   a first pin with the hood attachment bracket;
   a second pin with the storage connection point; and
   wherein the first and second pins are operable to engage the rod end bearing.

9. The hood prop member for a vehicle of claim 8, comprising
   a first ball detent with the first pin;
   a second ball detent with the second pin; and
   wherein the first and second ball detents are operable to maintain the rod end bearing on the first pin and second pin, respectively.

10. The hood prop member for a vehicle of claim 6, wherein the pivoting end of the prop rod comprises a rod end bearing.

11. The hood prop member for a vehicle of claim 6, comprising a storage connection point coupled to the support rod, wherein the prop rod is couplable to the storage connection point.

12. A method for configuring a vehicle, comprising:
   providing a support rod having a first end configured to attach to a first portion of the vehicle and a second end configured to attach to a second portion of the vehicle;
   providing a prop rod having a connection end and a pivoting end wherein the connection end of the prop rod comprises a rod end bearing;
   pivotingly attaching the pivoting end of the prop rod proximate an end of the support rod;
   providing a hood attachment point with a hood of the vehicle;
   providing a storage connection point proximate the support rod, and being couplable to the connection end of the prop rod;
   attaching the connection end of the prop rod to the storage connection point to increase the structural integrity of the support rod while the hood is in a down position; and
   attaching the connection end of the prop rod to the hood attachment bracket to maintain the hood of the vehicle in a hood-raised position.

13. The method of claim 12, wherein the storage connection point is attached to the support rod.

* * * * *